(12) United States Patent
Galic

(10) Patent No.: US 11,228,264 B2
(45) Date of Patent: Jan. 18, 2022

(54) METHOD OF DETERMINING THE POSITION OF A FREELY ROTATING ROTOR IN A PERMANENT MAGNET MOTOR, AND A CONTROL CIRUIT AND A SYSTEM THEREFOR

(71) Applicant: Bombardier Transportation GmbH, Berlin (DE)

(72) Inventor: Johann Galic, Surahammar (SE)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 16/867,688

(22) Filed: May 6, 2020

(65) Prior Publication Data
US 2020/0358381 A1    Nov. 12, 2020

(30) Foreign Application Priority Data
May 7, 2019   (SE) .................................... 1950546-0

(51) Int. Cl.
*H02P 6/18*      (2016.01)
*H02P 6/182*     (2016.01)
*H02P 6/17*      (2016.01)
*H02P 103/20*    (2016.01)

(52) U.S. Cl.
CPC ............... *H02P 6/182* (2013.01); *H02P 6/17* (2016.02); *H02P 2103/20* (2015.01)

(58) Field of Classification Search
CPC .................................. H02P 6/182; H02P 6/17
USPC .................................................... 318/400.34
See application file for complete search history.

(56) References Cited

U.S. PATENT DOCUMENTS

| | | | |
|---|---|---|---|
| 4,540,921 A | | 9/1985 | Boyd, Jr. et al. |
| 5,782,610 A | * | 7/1998 | Ikeda ................... F04C 18/0215 318/379 |
| 2003/0231875 A1 | | 12/2003 | Masino |
| 2008/0048598 A1 | | 2/2008 | Shibuya |
| 2008/0252242 A1 | * | 10/2008 | Akama ..................... H02P 6/06 318/400.14 |

(Continued)

FOREIGN PATENT DOCUMENTS

| | | |
|---|---|---|
| JP | 2006-025587 A | 1/2006 |
| JP | 2006238541 A | 9/2006 |

(Continued)

OTHER PUBLICATIONS

Schroedl et al., "Sensorless Control of Reluctance Machines at Arbitrary Operating Conditions Including Standstill," (1994), IEEE Transactions on Power Electronics; 9(2): 225-231.

*Primary Examiner* — Erick D Glass
(74) *Attorney, Agent, or Firm* — Dilworth & Barrese, LLP

(57) ABSTRACT

A control circuit, a system and a method 200 of determining a position of a rotor in a permanent magnet motor PM1 in a state when the rotor is freely rotating, the motor being connected to a direct voltage link 101 via an inverter circuit 102, wherein the inverter circuit is operable for connecting windings of a stator of said motor to the direct voltage link, the method comprising the following a step a) short circuiting 201 the windings of the stator of said permanent magnet motor, a step b) measuring 202 a back electromotive force EMF of the short-circuited windings of the stator; and a step c) determining 203 the position of the rotor by means of the measured back EMF.

3 Claims, 3 Drawing Sheets

(56) References Cited

U.S. PATENT DOCUMENTS

| | | | |
|---|---|---|---|
| 2015/0214876 A1 | 7/2015 | Itoigawa et al. | |
| 2016/0285897 A1 | 9/2016 | Feng et al. | |
| 2017/0070169 A1* | 3/2017 | Altendorf | H02P 6/182 |
| 2017/0302215 A1* | 10/2017 | Jing | H02P 29/0241 |
| 2018/0087925 A1 | 3/2018 | Murray et al. | |

FOREIGN PATENT DOCUMENTS

| | | |
|---|---|---|
| JP | 2008-029046 A | 7/2008 |
| JP | 2013-021843 A | 1/2013 |
| WO | 2013/132248 A1 | 9/2013 |

\* cited by examiner

METHOD OF DETERMINING THE POSITION OF A FREELY ROTATING ROTOR IN A PERMANENT MAGNET MOTOR, AND A CONTROL CIRUIT AND A SYSTEM THEREFOR

TECHNICAL FIELD

The present invention relates to a method of determining the position of a rotor in a permanent magnet motor. More particularly the present invention relates to a method of determining the position of a freely rotating rotor in a permanent magnet motor.

BACKGROUND

In modern track-bounded vehicles with permanent magnet motors there is a large need for determining the position of the rotor since in order to control a permanent magnet motor the rotor position must be known, and especially if the rotor is in a freely rotating state this is not easily achieved. Such a state may for example occur if a track-bound vehicle is traveling downhill and the stator winding is inactive and the rotor rotates freely in order to save energy. When the motor is activated again it is required to have a precise knowledge of the position of the rotor in order to provide a magnetic field with the correct phase relative the rotor. There is a large need for a method of determining the position of a freely rotating rotor in a permanent magnet motor.

Furthermore, if a track-bound vehicle is equipped with two or more permanent magnet motor connected to the same direct voltage link it is important that the method of determining the position of the freely rotating rotor does not affect the voltage of the direct voltage link or cause unwanted motor torque which could affect the passengers comfort and/or cause unnecessary wear on the drive train of the track-bound vehicle.

There are several known methods for determining a position of a rotor in a permanent magnet motor which is stopped i.e. the rotor has no angular velocity. However, these methods cannot be employed for determining the position of a freely rotating rotor.

In this disclosure "freely rotating rotor" should be interpreted as a rotor rotating without influence from a magnetic field provided by electric current running in the windings of the stator. Usually this means that an inverter circuit keeps the leads of the windings in a high impedance state without connection to the direct voltage link (DC-link).

SUMMARY

The present invention provides a circuit, a system, and a method for determining a position of a rotor in a permanent magnet motor, in a state where the rotor is freely rotating. Small errors in the determined position of the freely rotating rotor may cause sever disturbances in motor torque and DC-link voltage during startup of the freely rotating rotor. Several known solutions require to stop the freely rotating rotor before the rotor position is determined and the motor can be started.

According to the present invention, a method of determining a position of a rotor in a permanent magnet motor in a state when the rotor is freely rotating is provided. The motor being connected to a direct voltage link via an inverter circuit, wherein the inverter circuit is operable for connecting windings of a stator of said motor to the direct voltage link, the method comprising the following steps:

a) short circuiting the windings of the stator of said permanent magnet motor;
b) measuring a back electromotive force (EMF) of the short-circuited windings of the stator; and
c) determining the position of the rotor by means of the measured back EMF.

This method is advantageous because it allows determining the position of the freely rotating rotor without stopping the rotor. Furthermore, it allows determining the position of the freely rotating rotor without disturbing the direct voltage link or inducing motor torque, which may be advantageous if several permanent magnet motors are connected to the same direct voltage link. Further, the method may also be useful if other vehicles are connected to the same DC line, such as for example in a direct voltage feed system.

In one embodiment the step a) further comprises: determining a desired maximum back EMF current; determining a speed of the freely rotating rotor; calculating a predetermined short-circuiting interval based on the desired maximum back EMF current, the speed of the freely rotating rotor, and motor parameters; and short-circuiting the windings by means of the inverter circuit during the predetermined short-circuiting interval.

This allows a very small back EMF current to be selected for determining the position, and thus reduce unnecessary heating of the permanent magnet motor and the inverter circuit. The regenerated power, and the motor torque, may be very small if the desired maximum back EMF current is sufficiently small.

In one embodiment the step a) further comprises: determining a desired maximum back EMF current; short-circuiting the windings of the stator and measuring the back EMF current and when the measured back-EMF current is equal to or above the desired maximum back EMF current the short-circuiting is aborted.

This allows use of standard current protection circuits of the permanent magnet motor for setting the maximum back EMF current. For example, during the determining of the position of the rotor the overcurrent protection setting of the permanent magnet motor is lowered to the desired maximum back EMF current.

In a preferred embodiment, the step a) to c) are performed in a synchronous reference frame phase-locked loop.

This allows a fast and efficient determining of the rotor position of the permanent magnet motor, in a state where the rotor is freely rotating, which is easy to implement both in software and hardware.

DRAWINGS

DETAILED DESCRIPTION OF EMBODIMENTS

As will be explained in detail below, the present inventor has devised a way to determine a position of a rotor in a permanent magnet motor in a state where the rotor is freely rotating. This is achieved by short-circuiting windings of the stator and measure the induced back electromotive force (EMF) current and use of a phase locked loop for determining the position.

The rotating rotor of a permanent magnet motor generate a three-phase back EMF with a u-phase, according to:

$$e(t) = \omega_{el} \cdot \Psi_m \cdot \sin(\alpha)$$

$$\alpha = \omega_{el} \cdot t$$

$$\omega_{el} = p/2 \cdot \omega$$

where $\Psi_m$ is the flux-linkage generated by the permanent magnet, $\alpha$ is the position of the rotor, $\omega$ is the rotational speed of the rotor, and p is the number of poles in the motor.

The induced back EMF in a short-circuited permanent magnet motor $i_{ph}$, with the short circuit time $(t_{ON})$ much smaller than $1/(2\pi \cdot \omega_{el})$, may be derived to be equal to:

$$i_{ph}(t_k) = \omega_{el} \cdot \Psi_m \cdot \cos(\omega_{el} \cdot t_k) \cdot t_{ON}/L_{q[eq]0}]$$

where $t_{ON}$ is the short-circuiting time, $\omega_{el}$ is the rotational velocity with respect to the poles of the motor, $\Psi_m$ is a flux-linkage generated by the permanent magnet, $L_q$ is the motor inductance in q-direction, and $i_{ph}$ is the back EMF current.

The back EMF current $i_{ph}$ allows for determining the rotor position without stopping the rotor.

First Embodiment

Figure 1:
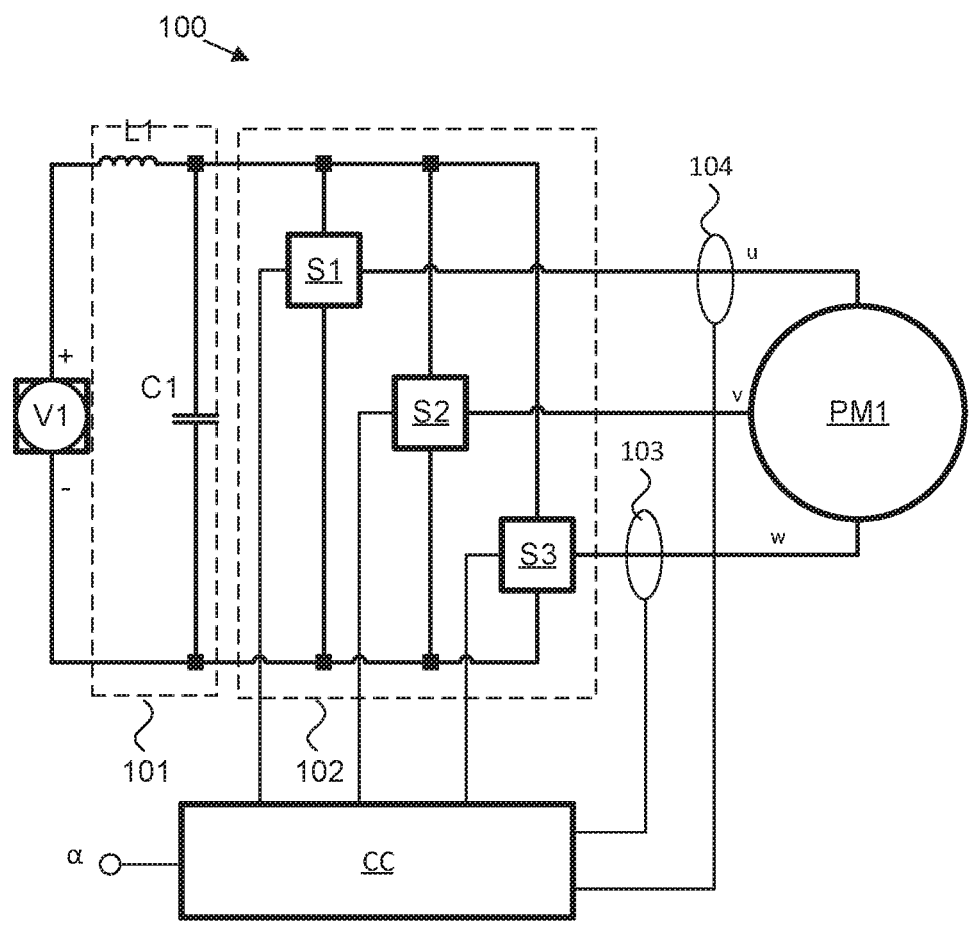
FIG. 1 is a block diagram of a control circuit according to an embodiment of the invention.

FIG. 1 is a schematic block diagram of a control circuit, generally designated CC, for determining a position of a rotor in a permanent magnet motor PM1 in a state when the rotor is freely rotating. The motor being connected to a direct voltage link 101 via an inverter circuit 102. The direct voltage link has a capacitor C1 connected between the positive line, indicated by a "+", and the negative line, indicated by a "−". Furthermore, the direct voltage link has an inductor L1 connected in series to a DC voltage source V1. The voltage source may be an AC source and a rectifier network which provides DC voltage to the direct voltage link. The inverter circuit 102 has control lines connected to the control circuit. The inverter circuit comprises a number of switching elements S1,S2,S3 which are controlled by respective control lines. Upon activation of the switching elements by means of respective control line, the output of the switching element is connected to either the positive line of the direct voltage link or the negative line of the direct voltage link, dependent on the control signal applied to the control line. A common implementation of a switching element are two transistors connected in series between the positive line and the negative line of the direct voltage link. The output of the switching element is connected to the wire that connects the transistors to each other. A common transistor type for use in a switching element is an IGBT (Insulated Gate Bipolar Transistor), but a power MOSFET may also be used.

The control circuit has control signal outputs connected to the control lines of the inverter circuit and thereby to the corresponding switching elements. The control signal outputs are operable for controlling the power supply to windings of the stator of said motor by means of the inverter circuit during an interval. These control signal outputs may be used to short-circuit all windings if the switching elements simultaneously connects the windings to either the positive line or to the negative line. This means that the inverter circuit used for driving the permanent magnet motor may be used to short-circuit the windings.

The control circuit also has back electromotive force (EMF) current sensors 103, 104 provided for measuring the back EMF currents of windings of the stator of said motor during short-circuiting of the windings.

The control circuit further comprises an output a providing the determined position of the rotor, wherein the control circuit is configured to short-circuit the windings of the stator by means of the inverter circuit during the interval, and configured to measure the back EMF currents induced in the windings, wherein the control circuit is configured to use the measured back EMF currents to calculate the position of the rotor.

Figure 2:
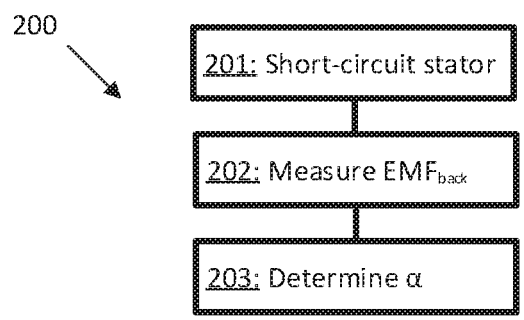
FIG. 2 is a schematic block diagram illustrating a method according to an embodiment of the invention.

In order to understand how this determining of the rotor position is performed reference is now made to FIG. 2 which is a flow chart illustrating the method, which is generally designated 200.

The method involves:
a) Short-circuiting (201) the windings of the stator of said permanent magnet motor. Since the rotor is in a state of rotation the permanent magnets of the rotor may induce a back EMF current in the stator if the windings thereof are connected to a load or short-circuited.
b) Measuring (202) a back electromotive force (EMF) of the short-circuited windings of the stator; and
c) Determining (203) the position of the rotor by means of the measured back EMF.

Second Embodiment

Preferably, the short-circuiting interval is as short as possible due to the stress a short-circuit may induce in the motor and inverter circuit. The method may in one embodiment comprise:

Determining a desired maximum back EMF current, suitable for the permanent magnet motor, the inverter circuit, and the direct voltage link.

Determining a speed of the freely rotating rotor, this may for example be achieved if the permanent magnet motor is used on a track-bound vehicle by its speedometer or GPS speed. Other embodiments may utilize some rotation sensors.

Calculating a predetermined short-circuiting interval based on the desired maximum back EMF current, the speed of the freely rotating rotor, and motor parameters. This can be performed using the following equation:

$$t_{ON} = \omega_{el} \cdot \Psi_m / (L_q \cdot i_{ph,max}) \qquad [eq1]$$

which is derived using the equations and definitions from above, where $t_{ON}$ is the short-circuiting time, $\omega_{el}$ is the rotational velocity with respect to the poles, $\Psi_m$ is a flux-linkage generated by the permanent magnet, $L_q$ is the motor inductance in q-direction, and $i_{ph,max}$ is the desired maximum back EMF current.

Third Embodiment

In a third embodiment, which may not involve a calculation of the short-circuiting interval. The method involves determining a desired maximum back EMF current. The method further involves short-circuiting the stator and measuring the back EMF current and when the measured back-EMF current is equal to or above the desired maximum back EMF current the short-circuiting is aborted. This third embodiment may use an internal over-current protection of the permanent magnet motor for setting the desired maximum back EMF current.

Phase-Locked Loop

Figure 3:
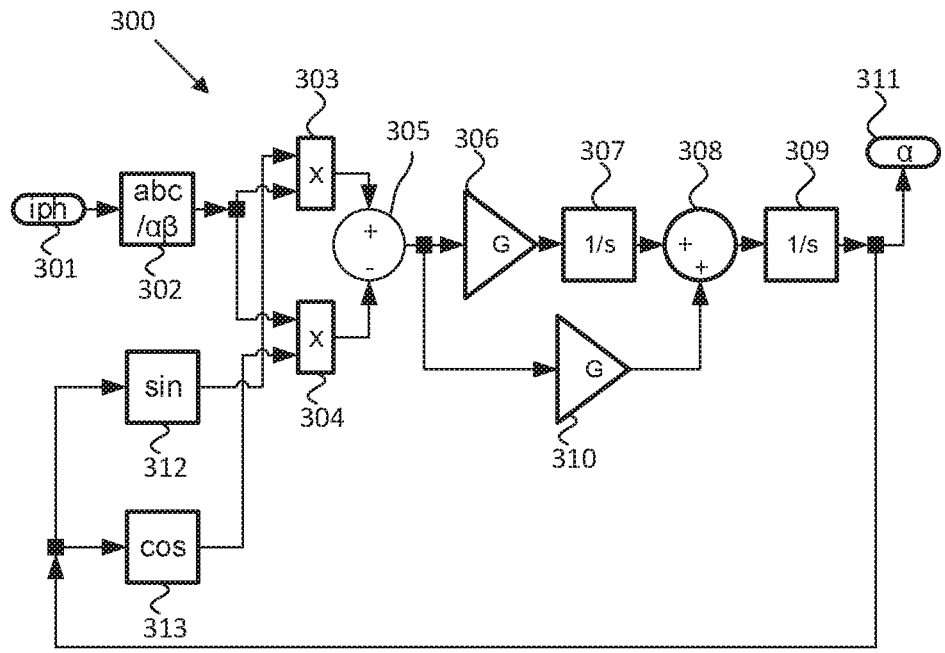
FIG. 3 is a schematic block diagram of a phase locked loop according to an embodiment of the invention.

The above discussed methods and embodiments are preferably executed in a phase-locked loop, with the stator currents used as input to the phase-locked loop. Such a phase-locked loop is shown in FIG. 3 as a block diagram, generally designated 300.

The phase-locked loop comprises an input terminal 301 for receiving the measured back EMF current, the received back EMF current three-phase quantities at an angle of 120 degrees to each other is transformed to orthogonal stationary reference frame, in which 1α (along α axis) and 1β (along β axis) are perpendicular to each other, but in the same plane as the three-phase reference frame in block 302, the transformed signal are input to a first multiplier 303, and to a second multiplier 304. The difference between the output of the first multiplier and the second multiplier is calculated in a difference block 305. This difference is used as input to a first gain stage 306 and as an input to a second gain stage 310. The amplified difference from the first gain stage 306 is input to a first integrator 307. The output from the first integrator 307 is input to a sum block 308. The output from the second gain stage 310 is also input to the sum block 308. The output from the sum block 308 is integrated in a second integrator 309, wherein the output from the second integrator is the determined position of the rotating rotor available at output terminal 311. However, the determined position is used as a feedback signal to a sine block 312, and to a cosine block 313. The output from the sine block is used as input to the first multiplier 303. The output from the cosine block 313 is used as input to the second multiplier 304. This way the determined position of the rotor is calculated.

Experiment 1

Figure 4:
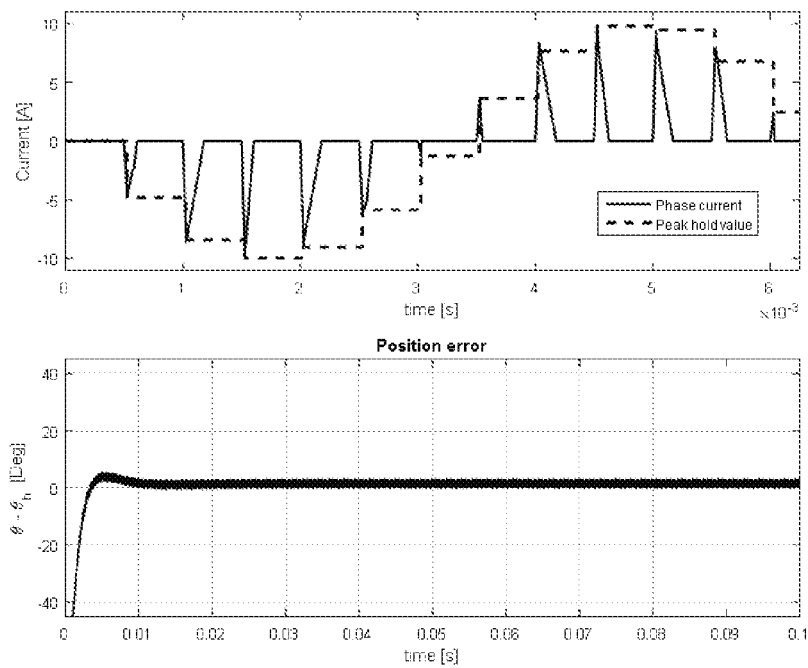
FIG. 4 is a graph illustrating an experiment performed according to an embodiment of the present invention.

In FIG. 4 a data plot from a first experiment is disclosed. This experiment is performed on a permanent magnet motor with a target of a desired maximum back EMF current of 10 A. The method according to the second embodiment were employed together with a Phase-Locked Loop according to FIG. 3. The switching frequency, fsw, at low speed is calculated such that the duty cycle ($f_{sw}*t_{ON}$) is equal to, or below, 0.5. A maximum switching frequency is selected as 2 kHz. This resulted in a $t_{ON}$=27 us using motor parameters and equation [eq1].

The first plot in FIG. 4 shows the measured back EMF current as function of time, as triangular pulses. A peak-and-hold circuit were used to measure the maximum back EMF current during each interval and is shown in the plot as square signals.

The second plot in FIG. 4 shows the difference in position between the true position of the freely rotating rotor and the determined position of the freely rotating rotor versus time. From this plot it is clear that the error in estimated position approaches zero after 10 ms. This clearly shows the beneficial features of the second embodiment.

Experiment 2

Figure 5:
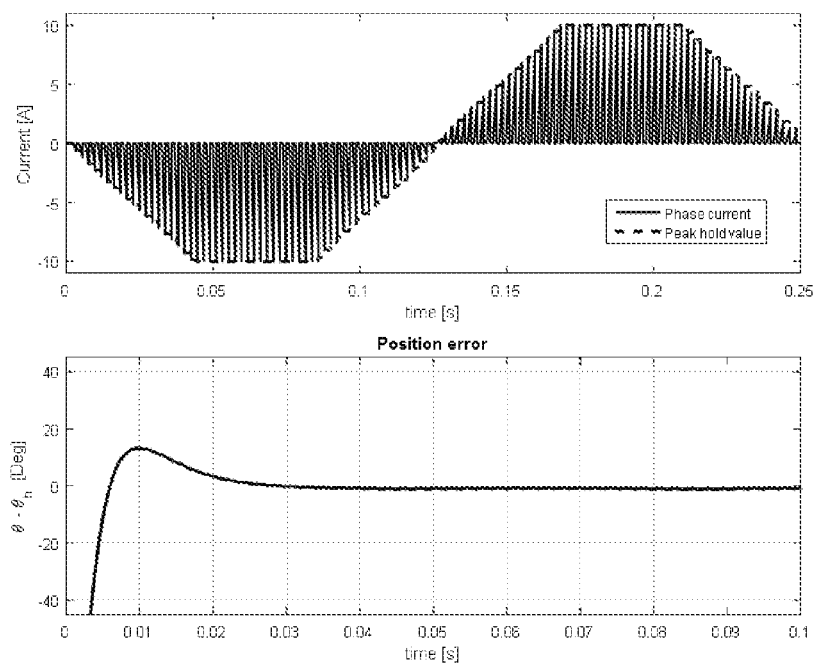
FIG. 5 is a graph illustrating an experiment performed according to an embodiment of the present invention.

In FIG. 5 a data plot from a second experiment is disclosed. This experiment is performed on a permanent magnet motor with a target of a desired maximum back EMF current of 10 A. The method according to the third embodiment were employed together with a Phase-Locked Loop according to FIG. 3. A maximum switching frequency is selected as 2 kHz. The first plot in FIG. 5 shows the measured back EMF current as function of time, as a trapezoidal waveform. A peak-and-hold circuit were used to measure the maximum back EMF current during each interval and is shown in the plot as square signals. From this plot the maximum back EMF current of 10 A is easily seen in the trapezoidal motor current.

The second plot of FIG. 5 shows the difference in position between a true position of the freely rotating rotor and the determined position of the freely rotating rotor versus time. From this plot it is clear that the error in estimated position approaches zero after 25 ms. This clearly shows the beneficial features of the third embodiment.

Fourth Embodiment

Figure 6:
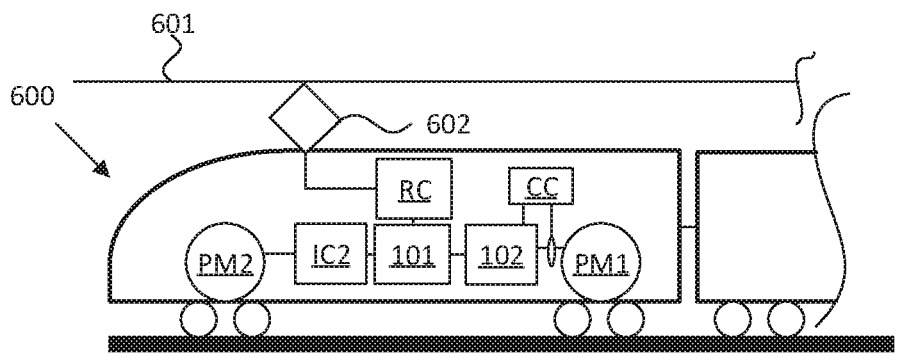
FIG. 6 is a schematic drawing of a track-bound vehicle according to an embodiment of the present invention.

In FIG. 6 a track-bound vehicle, generally designated 600, is schematically illustrated. The track bound vehicle 600 has a control circuit CC according to any of the above disclosed embodiments. The track-bound vehicle has a first permanent magnet motor PM1 and a direct voltage link 101. The direct voltage link is connected to a catenary 601 via a pantograph 602 and a rectifier circuit RC. Other ways of connecting the direct voltage link to a power supply is of course possible. The track-bound vehicle also has an inverter circuit 102 connected to the direct voltage link and to the first permanent magnet motor, wherein the inverter circuit comprises control lines for controlling the power supply to windings of a stator of said permanent magnet motor. The track-bound vehicle may also have a second permanent magnet motor PM2 connected to the direct voltage link 101 via a second inverter circuit IC2. This track-bound vehicle will now be discussed in a scenario were only the second permanent magnet motor is used and the first permanent magnet motor is freely rotating. When the load on the track-bound vehicle increases the first permanent magnet motor is needed, and since the track-bound vehicle is in motion the first permanent magnet motor cannot be stopped in order to determine the position of the rotor therein. The rotor position may be used for providing a smooth start of the first permanent magnet motor. Therefore the above disclosed embodiments may be useful for determining the position of the rotor in the first permanent magnet motor and thus providing a way of starting this motor without any disturbances on the direct voltage link. Since, starting a permanent magnet motor with known rotor position is easily done by a person skilled in the art.

Fifth Embodiment

According to a fifth embodiment, a non-transitory computer-readable medium stores therein a data storage program causing a computer to execute methods disclosed above and control an inverter circuit and receive information about measured back EMF currents. The computer may be a field programmable gate array (FPGA) device and/or a digital signal processor (DSP).

MODIFICATIONS AND VARIATIONS

Many modifications and variations can be made to the embodiments described herein.

For example, the inverter circuit may be connected to a battery instead of a direct voltage link. Thus the position of a freely rotating rotor may also be determined in a battery operated vehicle or machine, using methods disclosed herein. Thus, the inventive method only requires information about rotation speed of the freely rotating rotor and sensors for sensing back EMF current and some motor parameters.

The invention claimed is:

1. A method (200) of determining a position of a rotor in a permanent magnet motor (PM1) in a state when the rotor is freely rotating, the motor being connected to a direct voltage link (101) via an inverter circuit (102), wherein the inverter circuit is operable for connecting windings of a stator of said motor to the direct voltage link, the method comprising the following steps:
   a) short circuiting (201) the windings of the stator of said permanent magnet motor;
   b) measuring (202) a back electromotive force (EMF) of the short-circuited windings of the stator; and
   c) determining (203) the position of the rotor by the measured back EMF, wherein one of the following (i)-(iv):
   (i) step a) further comprises:
   determining a desired maximum back EMF current;
   determining a speed of the freely rotating rotor;
   calculating a predetermined short-circuiting interval based on the desired maximum back EMF current, the speed of the freely rotating rotor, and motor parameters; and
   short-circuit the windings by the inverter circuit during the predetermined short-circuiting interval; or
   (ii) step a) further comprises:
   determining a desired maximum back EMF current; and
   short-circuiting the stator and measuring the back EMF current and when the measured back-EMF current is equal to or above the desired maximum back EMF current the short-circuiting is aborted; or
   (iii) the steps a) to c) are performed in a synchronous reference frame phase-locked loop; or
   (iv) step a) to step c) are executed in a loop with a switching frequency of the inverter circuit such that the duty cycle is equal to, or below, 0.5.

2. A control circuit (CC) for determining a position of a rotor in a permanent magnet motor (PM1) in a state when the rotor is freely rotating, the motor being connected to a direct voltage link (101) via an inverter circuit (102) having control lines connected to the control circuit, the control circuit comprising:
   control signal outputs connected to the control lines of the inverter circuit, and operable for controlling the power supply to windings of a stator of said motor by the inverter circuit during an interval;
   back electromotive force (EMF) current sensors provided for measuring the back EMF currents of windings of a stator of said motor during short-circuiting of the windings;
   an output providing the determined position of the rotor, wherein the control circuit is configured to short-circuit the windings of the stator by the inverter circuit during the interval, and configured to measure the back EMF currents induced in the windings,
   wherein the control circuit is configured to use the measured back EMF currents to calculate the position of the rotor, and one of the following (i)-(iv):
   (i) further comprising:
   a maximum current circuit configured to determine a maximum back EMF current; and
   an input for receiving information about the rotor rotational speed;
   wherein the control circuit is configured to determine the short-circuiting interval using the back EMF current, the rotational speed of the rotor, and motor parameters; or
   (ii) further comprising maximum current circuit configured to determine a maximum back EMF current, wherein the control circuit is configured to short-circuit the windings of the rotor by the inverter circuit, and during the short-circuiting measure the back EMF current and if the measured back EMF current is equal to, or above, the maximum back EMF current the short-circuiting is aborted; or
   (iii) further comprising a synchronous reference frame phase-locked loop circuit (300) connected to the back EMF current sensors and configured to output a rotor position signal; or
   (iv) the steps a) to c) are performed during a predetermined period at a switching frequency such that the duty-cycle is equal to, or above, 0.5.

3. A track bound vehicle (600) comprising:
   a control circuit (CC) for determining a position of a rotor in a permanent magnet motor (PM1) in a state when the rotor is freely rotating, the motor being connected to a direct voltage link (101) via an inverter circuit (102) having control lines connected to the control circuit, the control circuit comprising:
   control signal outputs connected to the control lines of the inverter circuit, and operable for controlling the power supply to windings of a stator of said motor by the inverter circuit during an interval;
   back electromotive force (EMF) current sensors provided for measuring the back EMF currents of windings of a stator of said motor during short-circuiting of the windings;
   an output providing the determined position of the rotor, wherein the control circuit is configured to short-circuit the windings of the stator by the inverter circuit during the interval, and configured to measure the back EMF currents induced in the windings,
   wherein the control circuit is configured to use the measured back EMF currents to calculate the position of the rotor;
   a permanent magnet motor (PM1);
   a direct voltage link (101);
   an inverter circuit (102) connected to the direct voltage link and to the motor,
   wherein the inverter circuit comprises control lines for controlling the power supply to windings of a stator of said motor.

* * * * *